(12) United States Patent  
Lecoutre et al.

(10) Patent No.: US 8,142,044 B2  
(45) Date of Patent: Mar. 27, 2012

(54) SEALED CONTAINER WITH GLOVE AND LIGHTING MEANS LOCATED WITHIN A WALL

(75) Inventors: Serge Lecoutre, Saint Alexandre (FR); Christophe Coudiere, Montfaucon (FR)

(73) Assignee: Areva NC, Paris (FR)

( * ) Notice: Subject to any disclaimer, the term of this patent is extended or adjusted under 35 U.S.C. 154(b) by 374 days.

(21) Appl. No.: 12/513,247

(22) PCT Filed: Nov. 20, 2007

(86) PCT No.: PCT/EP2007/062585  
§ 371 (c)(1),  
(2), (4) Date: May 1, 2009

(87) PCT Pub. No.: WO2008/061986  
PCT Pub. Date: May 29, 2008

(65) Prior Publication Data  
US 2010/0060119 A1 Mar. 11, 2010

(30) Foreign Application Priority Data  
Nov. 23, 2006 (FR) ...................... 06 55059

(51) Int. Cl.  
F21V 33/00 (2006.01)  
A47F 11/10 (2006.01)  
A47B 97/00 (2006.01)

(52) U.S. Cl. .................. 362/125; 362/154; 362/217.14; 312/223.5; 312/114

(58) Field of Classification Search .................. 362/125, 362/154, 217.14–217.17; 312/1, 114, 223.5  
See application file for complete search history.

(56) References Cited

U.S. PATENT DOCUMENTS

| | | | | |
|---|---|---|---|---|
| 2,259,147 | A * | 10/1941 | Ahrens | 362/126 |
| 2,576,008 | A * | 11/1951 | Gladfelter et al. | 451/89 |
| 2,816,318 | A * | 12/1957 | Philipp | 16/289 |
| 3,172,994 | A * | 3/1965 | Peay et al. | 219/393 |
| 3,612,825 | A * | 10/1971 | Chase et al. | 219/405 |
| 4,059,903 | A * | 11/1977 | Piet et al. | 312/1 |
| 4,697,854 | A * | 10/1987 | Lunsford | 312/223.5 |
| 5,374,116 | A * | 12/1994 | Borgen et al. | 312/116 |
| 5,863,505 | A | 1/1999 | Wada et al. | |
| 6,193,391 | B1 * | 2/2001 | Ray et al. | 362/221 |
| 6,361,181 | B1 * | 3/2002 | Bales | 362/92 |
| 6,558,020 | B1 * | 5/2003 | Holzer | 362/221 |

(Continued)

FOREIGN PATENT DOCUMENTS

DE 197 22 111 A1 12/1997

(Continued)

OTHER PUBLICATIONS

International Search Report for PCT/EP2007/062585, Jan. 24, 2008.

*Primary Examiner* — Ismael Negron  
(74) *Attorney, Agent, or Firm* — Pearne & Gordon LLP

(57) ABSTRACT

A glove box with a sealed containment area delimited at least partially by a wall having a an inner partition facing the sealed containment area, an outer partition spaced from the inner partition and located outside of the containment area, and a lighting means with a light source housed between the inner partition and the outer partition.

14 Claims, 3 Drawing Sheets

U.S. PATENT DOCUMENTS

| | | | |
|---|---|---|---|
| 6,578,983 B2 * | 6/2003 | Holten | 362/225 |
| 2003/0015945 A1 * | 1/2003 | Vandenbussche | 312/114 |
| 2003/0070404 A1 | 4/2003 | Calabrese | |

FOREIGN PATENT DOCUMENTS

| | | |
|---|---|---|
| EP | 0 554 117 A2 | 8/1993 |
| EP | 0 430 687 B1 | 2/1995 |
| FR | 2 741 745 A1 | 5/1997 |
| JP | 09-234253 A | 2/1996 |
| WO | 94/19922 A | 9/1994 |
| WO | 01/14515 A1 | 3/2001 |
| WO | 02/074504 A2 | 9/2002 |

* cited by examiner

SEALED CONTAINER WITH GLOVE AND LIGHTING MEANS LOCATED WITHIN A WALL

FEDERALLY SPONSORED RESEARCH OR DEVELOPMENT

Not Applicable.

JOINT RESEARCH AGREEMENT PARTIES

Not Applicable.

MATERIAL SUBMITTED ON COMPACT DISC

Not Applicable.

BACKGROUND OF THE INVENTION

1. Field of the Invention

The present invention relates generally to the field of glove boxes with lit sealed containments.

2. Discussion of the Prior Art

From the prior art, a solution consisting of placing one or more light sources inside the containment is known, said solution proving to be very satisfactory in terms of lighting quality obtained. Nevertheless, it is frequently necessary to provide a large lighting device when said device is intended to be housed within the sealed containment, which prevents the use thereof in certain areas of the glove box not having sufficient free space to receive such a lighting device. Moreover, in such a case, the maintenance of the device is extremely difficult, and waste treatment naturally proves to be complex and expensive.

From the prior art, a solution consisting of placing one or more light sources outside the containment is known, said solution offering the advantage of offering easy maintenance and only involving a low level of constraints in terms of waste treatment. However, it was observed that when a light source is placed outside the containment, i.e. behind a wall generally incorporating a polycarbonate partition and a biological protection partition spaced therefrom, the quality of the lighting obtained inside the glove box remained mediocre. Indeed, this is particularly explained by the creation of reflections on the polycarbonate partition and on the biological protection partition, thus rendering the lighting particularly ineffective.

SUMMARY OF THE INVENTION

In order to address the abovementioned problems at least partially, the invention proposes a glove box with a sealed containment delimited at least partially by a wall having a polycarbonate partition and a biological protection partition spaced from the polycarbonate partition and arranged externally with respect to same, the glove box also comprising lighting means of the containment, said lighting means comprising a light source housed between the polycarbonate partition and the biological protection partition.

With this original solution, it was observed that the lighting quality obtained inside the glove box was substantially identical to that encountered with the solutions according to the prior art wherein the lighting means were located within the sealed containment. This is explained by the fact that the specific arrangement of the light source between the polycarbonate partition and the biological partition limits the reflections of the light on said polycarbonate partition significantly due to the very close proximity between the source and said partition, the reflections of the light on the biological protection partition possibly becoming practically inexistent.

In addition, because the light source is placed outside the sealed containment delimited by the polycarbonate partition, preferentially made of Lexan®, maintenance is easy and the treatment of the associated waste proves to be relatively simple and therefore relatively inexpensive.

It is specified that the installation of the light source between the polycarbonate partition and the biological protection partition may advantageously be implemented on practically all the walls of the sealed containment, which makes it possible to limit the shaded zones therein significantly, as was particularly the case on some zones of the glove boxes according to the prior art.

Finally, as will be detailed below, the lighting means may advantageously be readily produced from simple and relatively inexpensive elements, which renders said means significantly optimized in terms of production cost.

Preferentially, the light source is a fluorescent tube, i.e. a low-pressure mercury vapor lamp wherein the greatest proportion of the light is emitted by one or more layers of fluorescent substances excited by the ultraviolet radiation of the discharge. The preferential choice of the fluorescent tube was adopted due to the very good perception of colors provided, without a stroboscopic effect, and the relatively low temperature thereof, these advantages proving to be all the more remarkable when the lighting means comprises an electronic ballast to supply said light source. In this respect, it is specified that the operating temperature of such a tube may advantageously be of the order of that generally encountered with light-emitting diodes.

The biological protection partition is preferentially a partition making it possible to reduce gamma radiations and/or neutrons. Preferentially, said biological protection partition is either a glass partition doped with a neutron-absorbing material and/or a dense absorbing material, such as lead glass, or a partition made of methacrylic resin, such as "Kyowaglas-XA®".

It is naturally envisaged that the dimension of a spacing between the polycarbonate partition and the biological protection partition is sufficient so that the light source can be housed in said inter-partition space, said dimension possibly being for example of the order of 40 mm, or less.

Preferentially, in order to reduce the reflections of light on the biological protection partition and the polycarbonate partition, the lighting means comprises a light source and a support body that supports and isolates the light source from the biological protection partition. The support body also includes a light diffusion opening that faces the sealed containment area and is sealed by the polycarbonate partition. In this configuration, no reflection of the light advantageously takes place on the biological protection partition as it is entirely isolated from the light source. Also, the close proximity between the light source and the polycarbonate partition generates very little reflection of light on the polycarbonate partition sealing the light diffusion opening of the support body.

Moreover, the lighting means preferentially also includes a light deflecting means integral to the support body and located therein, the deflecting means orienting the light emitted by the light source towards the polycarbonate partition.

As an indicative example, the support body may be a metallic element having a U-shaped cross-section. Both free ends of the U-shaped cross section are preferentially in contact with the polycarbonate partition. For information purposes, it is noted that the U-shaped cross section is preferentially adopted due to the easy production thereof.

Finally, to obtain the most satisfactory heat dissipation possible, the support body is provided in aluminum. Indeed, it was observed that the operating temperature of the lighting could advantageously be maintained less than 50° C., or even less than 40° C. in the case of use of "Kyowaglas-XA®" for the production of the biological protection.

Other alternative embodiments and features of the invention will emerge in the non-limitative detailed description hereinafter.

BRIEF DESCRIPTION OF THE DRAWINGS

This description will be made with reference to the appended figures wherein.

DETAILED DESCRIPTION OF THE INVENTION

Figure 5:
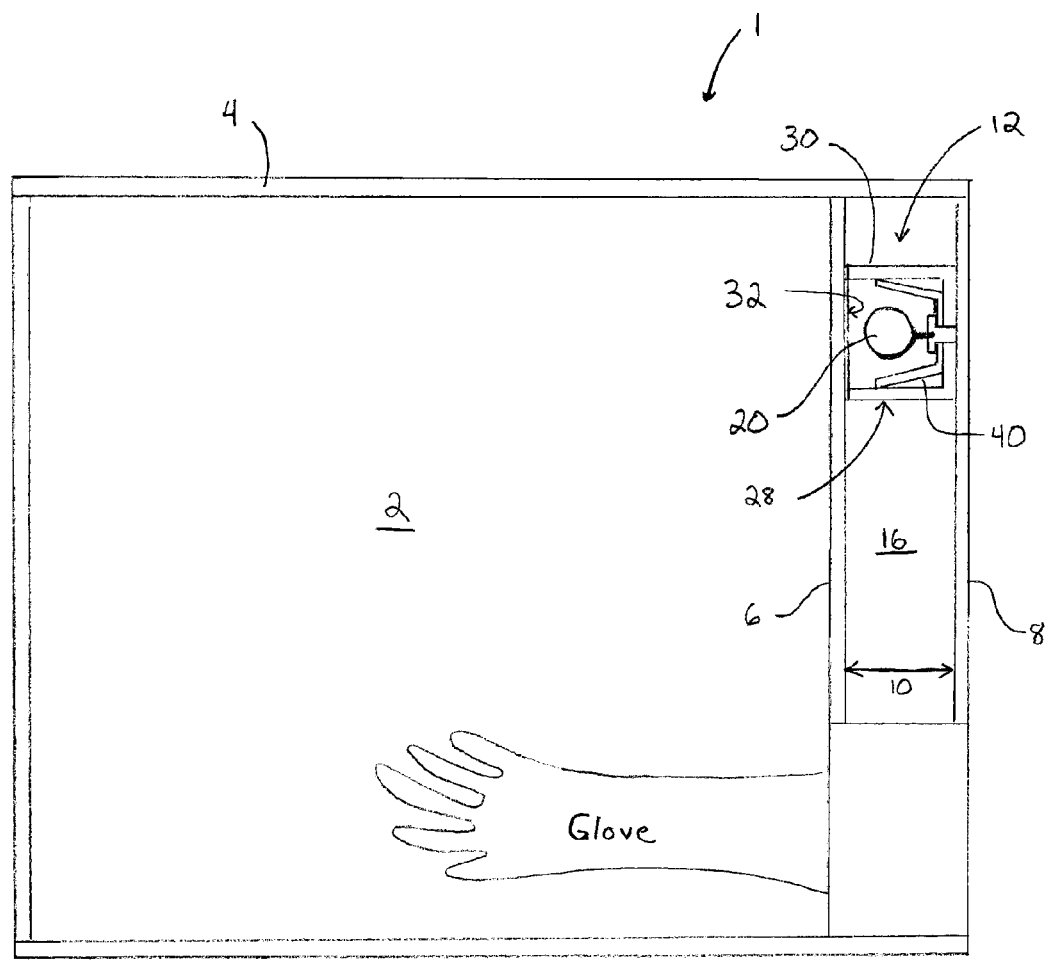
FIG. 5 represents a sectional view of a glove box according to one embodiment of the present invention.

With reference first of all to FIG. 5, it is possible to observe a sectional view of a lit glove box 1 according to a preferred embodiment of the present invention. Said glove box 1 has a sealed containment 2 delimited by a plurality of walls 4, only one of the plurality of walls 4 will be described hereinafter. However, it is noted that the other walls not described could have an identical or similar design, without leaving the scope of the invention.

Figure 2:
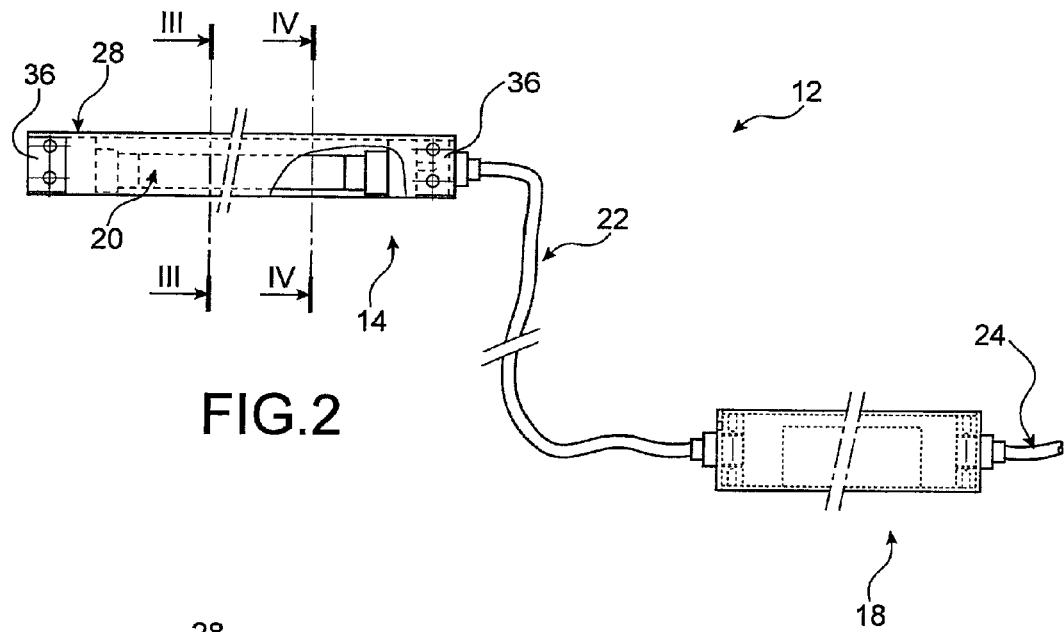
FIG. 2 represents a side view of the lighting means fitted in the glove box shown in FIG. 1.

FIG. 2 represents a part of the sectional view shown in FIG. 5. The wall 4 firstly comprises a polycarbonate partition 6, and more specifically made of Lexan®, the inner face of said partition 6 delimiting the sealed containment 2. Spaced from said partition 6, a biological protection partition 8 of the type made of lead glass or "Kyowaglas-XA®" is found, said partition 8 being arranged externally with respect to the partition 6 and spaced therefrom by a spacing 10 of the order of 40 mm, or of a lower value that can be lowered to 25 mm.

It is noted that the design described above is known to those skilled in the art, and corresponds to that frequently encountered on existing glove boxes.

Figure 1:
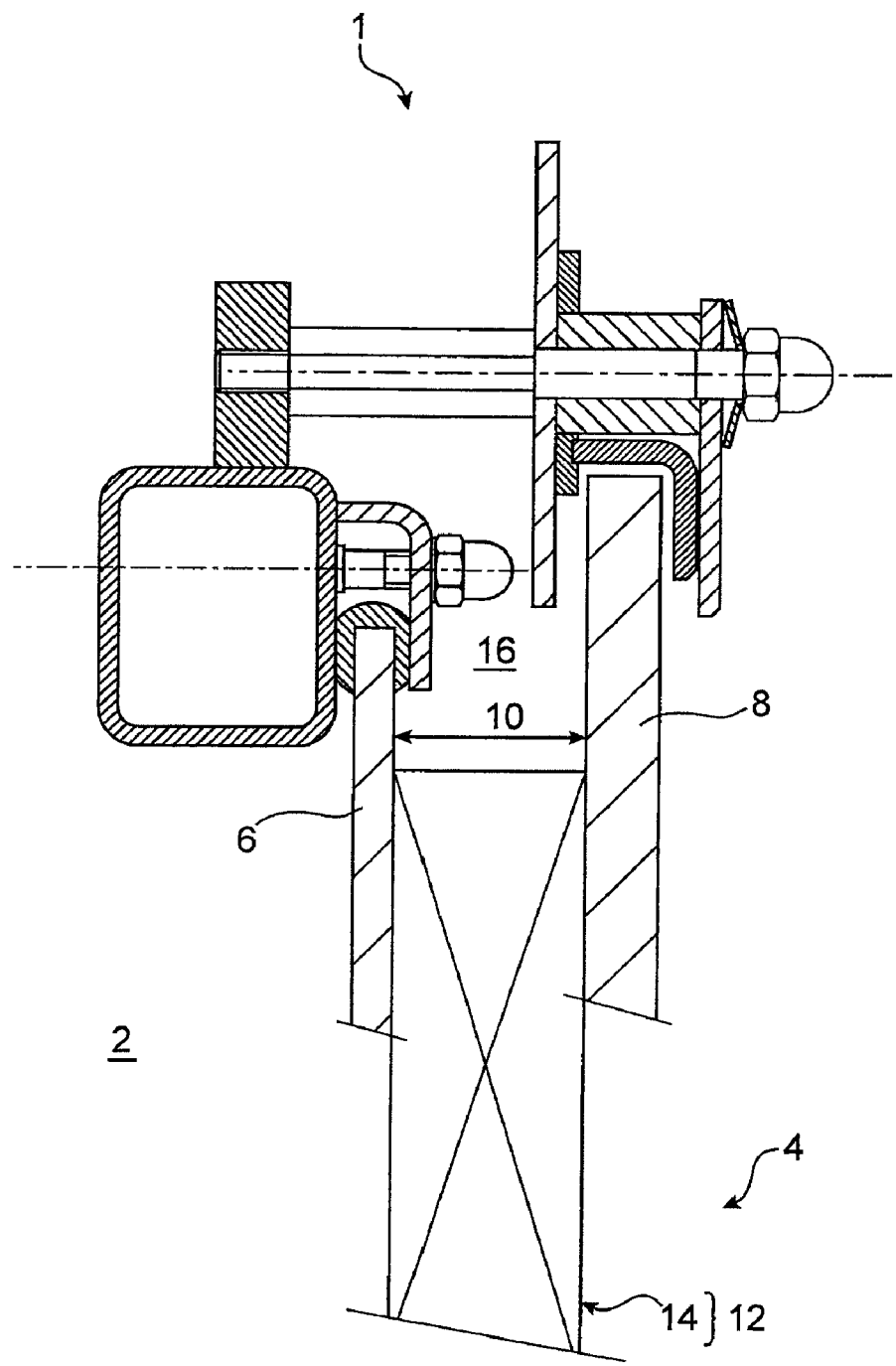
FIG. 1 represents a part of the sectional view of a part of a glove box shown in FIG. 5.

One of the specific features of the present invention lies in the design and positioning of lighting means 12 of the sealed containment 2. The lighting means 12 is shown partially and schematically in FIG. 1 and has the specificity of being a light source housed in the inter-partition space 16 defined between the partitions 6 and 8. More specifically, the entire lighting module 14 of the lighting means 12 is housed in the inter-partition space 16, said lighting module 14 being detailed in FIGS. 2 to 4, which will now be described.

Indeed, the lighting means 12 includes the lighting module 14 and an electronic ballast 18 which supplies electricity to the light source 20 of the lighting module 14, via suitable wiring 22. In this respect, it is specified that the ballast 18 is in turn connected via wiring 24 to a power source (not shown).

Therefore, the lighting module 14 comprises the light source 20 preferentially taking the form of a fluorescent tube, having a length of up to 1 m and having a diameter preferentially between 5 and 20 mm, for example 16 mm.

Figure 3:
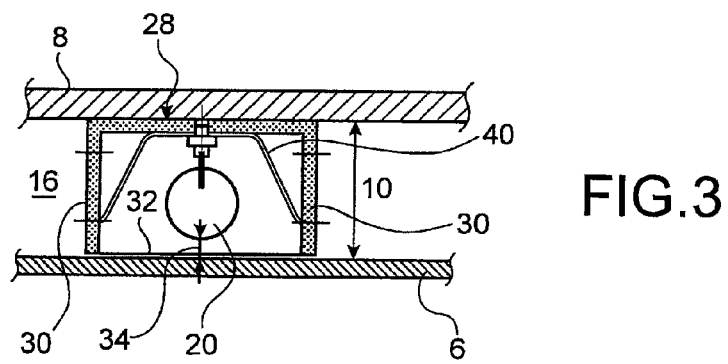
FIG. 3 represents a sectional view taken along the line III-III in FIG. 2.
Figure 4:
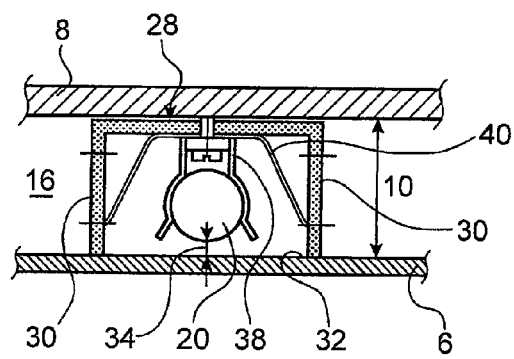
FIG. 4 represents a sectional view along the line IV-IV in FIG. 2.

In order to carry out the installation of the light source 20 in the inter-partition space 16, the lighting module 14 comprises a support body 28 preferentially having a U-shaped cross-section, and a length slightly greater than that of the light source 20 placed therein, as can be seen in FIGS. 2 to 4.

More specifically, the support body 28 has a thickness substantially identical to the spacing 10, i.e. the height of the two arms 30 of the U-shaped support body 28 is substantially equal to said spacing 10 between the two partitions 6 and 8. Therefore, by being inserted between said two partitions 6 and 8, the support body 28 may have the two free ends of the arms 30 of the U-shaped cross section in contact with the polycarbonate partition 6, which makes it possible to isolate the light source 20 entirely from the biological protection partition 8. In other words, the light diffusion opening 32 defined between the two arms 30 of the support body 28 preferentially made of aluminum and having a thickness between 2 and 4 mm, is sealed by the polycarbonate partition 6 whereon the light emitted by the light source 20 is practically not reflected. As such, it is noted that the minimum distance 34 between the light source 20 and the partition 6 is fixed so as to be preferentially less than 10 mm, or less than 5 mm.

Moreover, it is specified that while the support body 28 of the module 14 is intended to be introduced in a manner inserted between the two partitions 6, 8 by only providing for an assembly play between said elements, additional means may nevertheless be provided to ensure rigid attachment of said support body 28 on said partitions 6, 8. Preferentially, attachment tabs prevent any movement of the lighting system in the event of opening of the biological protection, for example for the verification that contamination is not present.

As can be seen most clearly in FIG. 2, the ends of the U-shaped support body 28 are sealed by end fittings 36, implying that the only opening through which light can be emitted is the opening 32 mentioned above, extending substantially over the entire length of said body 28.

In addition, FIG. 4 shows that the light source 20 is mounted on the support body 28 by means of support members 38 (only one being visible) wherein one end enables the snap fastening of the light source 20, and wherein the other end is mounted in a fixed manner on the base of the U-shaped support body 28, for example by means of screwing. Naturally, the support members 38 are spaced from each other in the direction of the light source 20 supported by same.

Finally, it is specified that, to direct the light emitted by the light source 20 in the direction of the diffusion opening 32, and therefore towards the partition 6, deflecting means 40 are also mounted in a fixed manner on the base of the U-shaped support body 28, said deflecting means 40 also being located in the space defined between the two arms 30 of the U-shaped support body 28 preferentially taking the form of a steel sheet with mirror type polishing, edged so as to have an opening (not referenced) oriented towards the diffusion opening 32, and therefore towards the polycarbonate partition 6.

Obviously, various modifications may be made by those skilled in the art to the invention described above, only as non-limitative examples.

The invention claimed is:

1. A glove box comprising:
   a plurality of walls defining a sealed containment area, wherein one of such walls includes an inner partition made of polycarbonate and facing the sealed containment area, and an outer partition spaced from the inner partition and facing an external space outside of the sealed containment area, the inner partition and outer partition defining an inter-partition space;

at least one glove member, the glove member extending from at least one of the plurality of walls and allowing for manipulation of an object inside the sealed containment area; and a lighting means, said lighting means including a light source which is positioned in the inter-partition space.

2. The glove box according to claim 1, wherein the light source is a fluorescent tube.

3. The glove box according to claim 1, wherein the lighting means includes an electronic ballast to supply electricity to the light source.

4. The glove box according to claim 1, wherein the outer partition prevents exposure of the external space to at least one of an amount of gamma radiations and an amount of neutrons inside the inter-partition space.

5. The glove box according to claim 4, wherein the outer partition is a methacrylic resin partition.

6. The glove box according to claim 1, wherein the outer partition is a glass partition doped with a dense absorbing material.

7. The glove box according to claim 6, wherein the outer partition is a lead glass partition.

8. A glove box according to claim 6, wherein the dense absorbing material is a neutron absorbing material.

9. A glove box according to claim 8, wherein the outer partition is a lead glass partition.

10. The glove box according to claim 1, wherein the lighting means includes a support body that supports the light source and isolates the light source from the outer partition, wherein the support body also includes a light diffusion opening that is sealed by the inner partition.

11. The glove box according to claim 10, wherein the lighting means also includes a light deflecting means that is integral to the support body and located therein, the light deflecting means configured to orient light emitted by the light source towards the inner partition.

12. The glove box according to claim 10, wherein the support body is made of aluminum.

13. The glove box according to claim 10, wherein the support body is a metallic element having a U-shaped cross-section.

14. The glove box according to claim 13, wherein both free ends of the U-shaped cross-section are in contact with the inner partition.

* * * * *